(12) United States Patent
Qin et al.

(10) Patent No.: US 8,242,655 B2
(45) Date of Patent: Aug. 14, 2012

(54) ENGINE COOLING SYSTEM AND MOTOR THEREFORE

(75) Inventors: Rui Feng Qin, Hong Kong (CN); Yi Jing, Shenzhen (CN); Xin Hui Guan, Shenzhen (CN); Gianpaolo Arucci, Asti (IT)

(73) Assignee: Johnson Electric S.A., La Chaux-de-Fonds (CH)

( * ) Notice: Subject to any disclaimer, the term of this patent is extended or adjusted under 35 U.S.C. 154(b) by 298 days.

(21) Appl. No.: 12/562,894

(22) Filed: Sep. 18, 2009

(65) Prior Publication Data

US 2010/0072851 A1  Mar. 25, 2010

(30) Foreign Application Priority Data

Sep. 19, 2008 (CN) .......................... 2008 1 0216253

(51) Int. Cl.
*H02K 23/64* (2006.01)
(52) U.S. Cl. ........................................ 310/158; 310/233
(58) Field of Classification Search .................. 310/158, 310/233; 123/41.49, 41.65, 41.12; 417/423.7
See application file for complete search history.

(56) References Cited

U.S. PATENT DOCUMENTS

| | | | | |
|---|---|---|---|---|
| 3,668,449 A * | 6/1972 | King | ............................ | 310/236 |
| 4,034,152 A | 7/1977 | Warner | | |
| 4,200,146 A * | 4/1980 | Olson | ........................... | 165/279 |
| 4,539,942 A * | 9/1985 | Kobayashi et al. | .......... | 123/41.1 |
| 4,933,587 A * | 6/1990 | Tanaka et al. | ................. | 310/233 |
| 6,057,623 A * | 5/2000 | Tanaka et al. | ................. | 310/206 |
| 6,376,775 B1 * | 4/2002 | Leijon et al. | .............. | 174/128.1 |
| 8,053,945 B2 | 11/2011 | Guan | | |
| 2002/0139592 A1* | 10/2002 | Fukasaku et al. | ............ | 180/65.2 |
| 2004/0245881 A1* | 12/2004 | Kadoya et al. | ................ | 310/185 |
| 2008/0252873 A1* | 10/2008 | Onojima | ........................... | 356/3 |

* cited by examiner

*Primary Examiner* — Quyen Leung
*Assistant Examiner* — Naishadh Desai
(74) *Attorney, Agent, or Firm* — Muncy, Geissler, Olds & Lowe, PLLC

(57) ABSTRACT

An engine cooling system, comprising a fan unit, cooling pipes and a coolant tank, the coolant tank, the cooling pipes and cooling channels of the engine being connected together and forming a cooling cycle, the fan unit being used to cool the cooling pipes and the coolant therein; wherein the fan unit comprises a motor and fan blades driven by the motor, the motor comprising a stator and a rotor rotatable mounted confronting the stator; the rotor comprising a shaft, a commutator fitted to the shaft, a rotor core fitted to the shaft adjacent to the commutator, windings wound about teeth of the rotor core and electrically connected to segments of the commutator; the windings being wound by aluminum cored wire that has a electrical insulation film around its peripheral surface.

12 Claims, 3 Drawing Sheets

ENGINE COOLING SYSTEM AND MOTOR THEREFORE

CROSS REFERENCE TO RELATED APPLICATIONS

This non-provisional patent application claims priority under 35 U.S.C. §119(a) from Patent Application No. 200810216253.7 filed in The People's Republic of China on Sep. 19, 2008.

FIELD OF THE INVENTION

This invention relates to an engine cooling system and in particular, to an electric motor for such a system. This invention is particularly suited to engines of automobiles.

BACKGROUND OF THE INVENTION

An internal combustion engine, particularly, an automotive engine will produce lots of heat when it's running. An engine cooling system is used to help discharging the heat, to prevent the heat damaging components of the engine. An engine cooling system usually comprises a coolant tank, cooling pipes and a fan unit. The heat is absorbed by coolant passing through cooling channels in the engine. After absorbing heat, the coolant circles to the coolant tank via the cooling pipes. The cooling pipes are cooled by a fan unit. The fan unit mainly comprises a motor and fan blades driven by the motor. The motor comprises a permanent magnet stator and a wound rotor.

A motor's windings are usually wound by copper wire, since copper wire has a good electrical conductivity, good strength and an acceptable chemical stability. The windings formed by winding copper wire are hereinafter called copper windings. Copper wire has a high hardness and sometimes, laminations such as a rotor core will be deformed by the copper windings during assembly. FIG. 6 shows a core of a rotor which had been wound with copper windings. The windings have been removed to show the distortion which can occur to the teeth of the rotor by copper wire during the winding process, the deformation is especially noticeable when the teeth are long. In particular, the force applied to the rotor teeth by the copper wire causes the outer laminations to bend, distorting the effective position of the center of the tooth which affects the commutation angle and thus the life and efficiency of the motor.

Furthermore, copper costs more than aluminum. In the past during hard economic times, it has been known to make windings from aluminum wire. The windings formed from aluminum wire are hereinafter called aluminum windings.

However, the use of aluminum windings will encounter many difficulties. It's difficult to solder aluminum wire to commutator segments which are usually made of copper. It is also difficult to attach aluminum windings to commutator hooks by the common welding or fusing techniques due to the soft nature of aluminum wire. Therefore, aluminum windings were used in brushless DC motor as a part of motor stator, instead of motor rotor. This will limit the use of aluminum windings.

Secondly, aluminum has a strong chemical activity and is vulnerable to corrosion and oxidation. Lead wires of aluminum wire are easily to oxidize, resulting in a higher resistivity. Therefore, the lead wires will become too hot when the motor is running, which may result in a motor failure or damage to parts of the motor.

In addition, aluminum has a higher resistivity than copper, and aluminum wire has a higher resistance than copper wire. Accordingly, under the same terminal voltage, the current in aluminum windings will be less than the current in copper windings. Therefore, performance of a motor using aluminum windings is affected. In other words, to make the current in aluminum windings equal to the current in copper windings, it is necessary to increase the diameter of aluminum wire. It will use more aluminum materials and increase the size of the motor.

Therefore, most motors, especially the motors used in automotive engine cooling application field, are equipped with copper windings. For an automotive engine cooling system, sometimes the motor stalls, for example, when the motor is frozen by low ambient temperature or its fan blades are blocked by an obstacle. In these circumstances, the current in the windings will be too large when the motor is powered on, and it can produces a lot of heat in a very short time such as 60 seconds, which will likely damaged the motor, resulting in cooling system failure.

SUMMARY OF THE INVENTION

Hence there is a desire for an improved engine cooling system and a motor therefore.

Accordingly, in one aspect thereof, the present invention provides an engine cooling system, comprising a fan unit, cooling pipes, cooling channels of the engine and a coolant tank, the coolant tank, the cooling pipes and the cooling channels of the engine being connected together and forming a cooling circuit, the fan unit being used to cool the cooling pipes and coolant therein, the fan unit comprising a motor and fan blades driven by the motor; wherein the motor comprises a stator and a rotor rotatable mounted confronting the stator; the rotor comprising a shaft, a commutator fitted to the shaft, a rotor core fitted to the shaft adjacent to the commutator, windings wound about teeth of the rotor core and electrically connected to segments of the commutator; the windings being formed from aluminum cored wire that has an electrical insulation film around its peripheral surface.

Preferably, each of the segments comprises a hook at one end, the hook having tin coating to electrically connect to lead wires of the windings.

Preferably, the surface of the hook is concave and forms an increased space for accommodating the lead wire(s) of the windings.

Preferably, the windings comprise a plurality of coils, each of the coils being wound about one tooth of the rotor core.

Preferably, the windings comprise a plurality of coils, each of the coils being wound about two or more teeth of the rotor core.

Preferably, the electrical insulation film comprises two insulation layers.

According to a second aspect, the present invention provides a electric motor used in an engine cooling system, the engine cooling system comprising fan blades driven by the motor to cooling an engine, wherein the motor comprises a stator and a rotor rotatable mounted confronting the stator; the rotor comprising a shaft, a commutator fitted to the shaft, a rotor core fitted to the shaft adjacent to the commutator, windings wound about teeth of the rotor core and electrically connected to segments of the commutator; the windings being formed from aluminum cored wire that has a electrical insulation film around its peripheral surface.

Preferably, each of the segments comprises a hook at one end, the hook having a tin coating to electrically connect to lead wires of the windings.

Preferably, each lead wire of the windings is soldered to a corresponding hook.

Preferably, the soldered lead wires and hooks are encapsulated by a protective film.

Preferably, the electrical insulation film comprises two insulation layers.

Preferably, the aluminum cored wire is copper clad aluminum wire.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
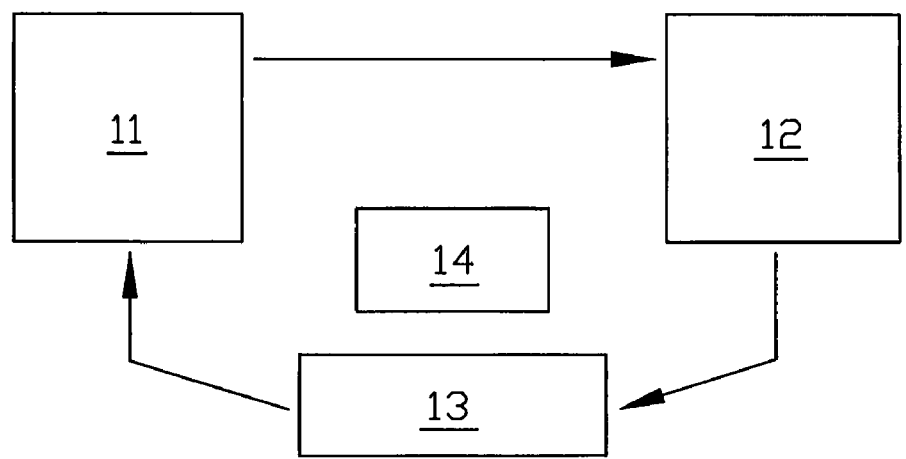
FIG. 1 is an assembly schematic diagram of an engine cooling system provided by an embodiment of the present invention.

FIG. 1 illustrates an engine cooling system according to an embodiment of the present invention. The system comprises a coolant tank 11, cooling pipes 13 and a fan unit 14. The coolant tank 11 is filled with coolant such as water. The coolant flowing out from the coolant tank 11 enters into the cooling channels of engine 12 and absorbs the heat produced by the engine 12, and then returns back to the coolant tank 11 via the cooling pipes 13, and thus forms a cooling cycle. The fan unit 14 is used to dissipate the head of cooling pipes 13 and the coolant thereof. Generally the coolant tank and the cooling pipes are formed together as a radiator.

Figure 2:
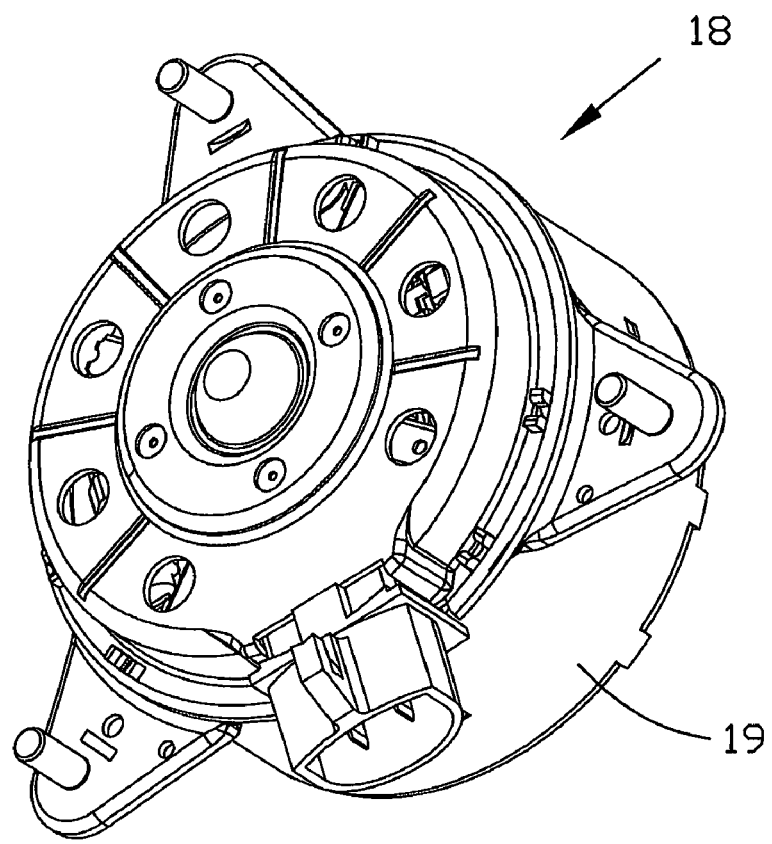
FIG. 2 is an isometric view of a motor used in an engine cooling system provided by an embodiment of the present invention.
Figure 3:
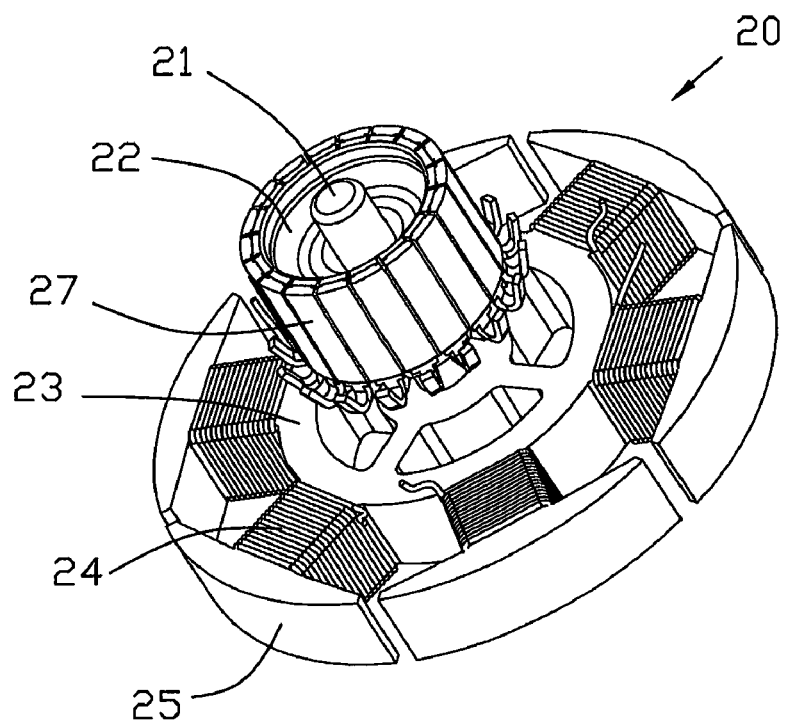
FIG. 3 is an isometric view of a rotor of the motor of FIG. 2.

The fan unit 14 comprises a motor and fan blades driven by the motor. Referring to FIG. 2, the motor comprises a stator 19 and a rotor 20 rotatably mounted confronting the stator 19. The stator 19 comprises a housing and magnets accommodated inside the housing. Referring to FIG. 3, the rotor 20 comprises a shaft 21, a commutator 22 fitted to the shaft, a rotor core 23 fitted to the shaft adjacent to one end of the commutator, and windings 24 which wind about teeth of the rotor core 23 and electrically connect to the commutator 22. The windings 24 are wound using aluminum cored wire that has electrical insulation film around its peripheral surface. For example, the aluminum cored wire can be enamel-insulated aluminum wire, copper-clad aluminum wire, etc. Each terminal portion or lead wire of windings 24 is connected to a corresponding segment 27 of commutator 22. For better protection against insulation breakdown, the electrical insulation film may have one or two layers of insulation. In FIG. 3 the lead wires are not shown connected to the commutator for ease of drawing but it is to be understood that the lead wires are connected to the commutator hooks. While soldering is mentioned as a preferred method of joining the lead wires to the commutator hooks, the common process of hot staking, fusing or welding in which the hook and lead wire are heated as the hook is bent to grip the lead wire is also preferred.

Figure 4:
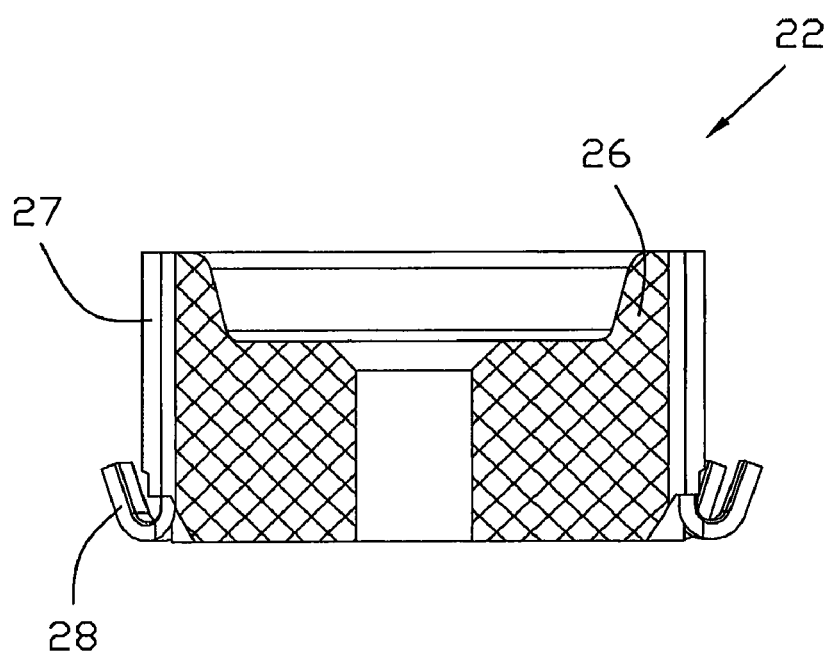
FIG. 4 is a sectional view of a commutator of the rotor of FIG. 3.

Referring to FIG. 4, the commutator 22 comprises a cylinder base 26 formed of plastics material or any other insulating materials and a plurality of segments 27 that distributes around a peripheral surface of the cylinder base. The segments are mainly made of copper. Each of the segments comprises a hook 28 at one end. It's preferred that the hook 28 has tin coating to achieve a better electrical connection to the winding wire. With the tin coating, lead wires of the aluminum cored wire can be easily soldered to the hook 28 and create a reliable electrical connection.

Furthermore, after soldering, the soldered lead wires and hooks are preferred encapsulated by a protective film to prevent the lead wires of aluminum cored wire being corroded by oxygen and/or moisture. For example, the protective film can be formed by an insulating resin.

Returning to FIG. 4, the surface of the hook 28 is concave relative to the contacting surface of the corresponding segment, and thus forms an increased space for accommodating the lead wire(s).

Figure 5:
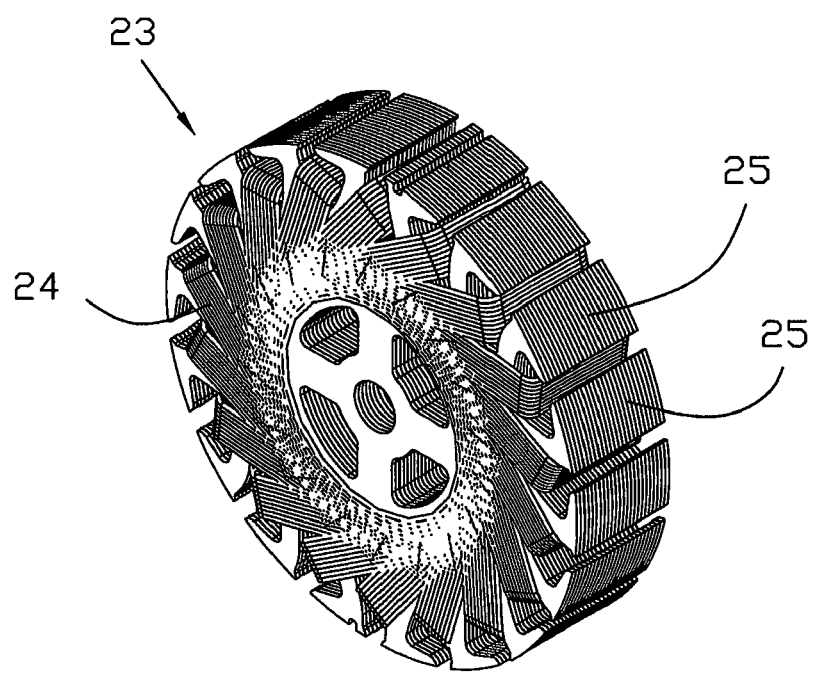
FIG. 5 is an isometric view of a rotor core according to a second embodiment, with coils of the windings each spanning more than one rotor tooth.
Figure 6:
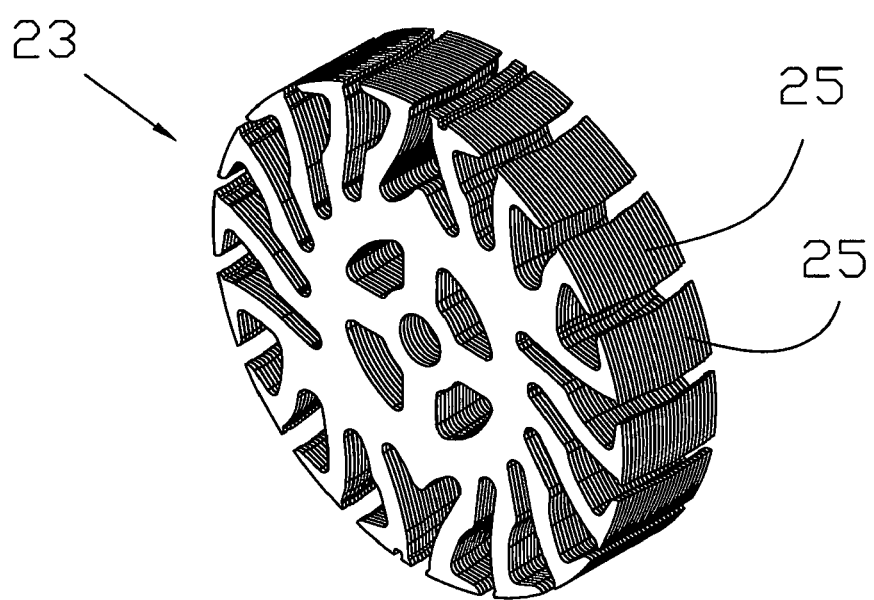
FIG. 6 is an isometric view of a core of a conventional rotor showing teeth deformed by copper windings.

In the embodiment, the windings 24 comprise a plurality of coils, each of which is wound about one tooth. In an alternative embodiment, each of the coils is wound about two or more teeth. FIG. 5 is an isometric view of a rotor core according to a second embodiment, in which coils of the windings 24 each span more than one rotor tooth 25.

In the embodiments of the present invention, aluminum cored wire is used to form the windings of a motor, especially a PMDC motor, which is preferred used in an engine cooling system to drive fan blades. Aluminum cored wire is cheaper than copper wire, resulting in a lower cost. On the other hand, aluminum cored wire has a larger resistance than copper wire. For the same terminal voltage, the current in aluminum windings will be smaller than that in copper windings. Therefore, when stalled, a motor equipped with aluminum windings is not so easy to burn out as motor equipped with copper windings.

In addition, aluminum cored wire has a lower hardness than copper wire. Therefore, teeth of a rotor are not so easily deformed during winding of the windings when using aluminum cored wire.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An engine cooling system, comprising a fan unit, cooling pipes, cooling channels in the engine and a coolant tank, the coolant tank, the cooling pipes and the cooling channels in the engine being connected together and forming a cooling circuit, the fan unit being used to cool the cooling pipes and coolant therein, the fan unit comprising a motor and fan blades driven by the motor; wherein the motor comprises a stator and a rotor rotatable mounted confronting the stator; the rotor comprising a shaft, a commutator fitted to the shaft, a rotor core fitted to the shaft adjacent to the commutator, windings wound about teeth of the rotor core and electrically connected to segments of the commutator; the windings being formed from aluminum cored wire that has an electrical insulation film around its peripheral surface, each of the segments comprising a hook formed at one end thereof, a protective film encapsulating the hook and lead wire of the windings after the lead wire and the hook are soldered together for preventing the soldered hook and lead wire from being corroded by oxygen and/or moisture.

2. The engine cooling system of claim 1, wherein, the hook has a tin coating to electrically connect to the lead wires of the windings, wherein the tin coating enables the lead wire to be easily soldered to the hook and create a reliable electrical connection.

3. The engine cooling system of claim 2, wherein the surface of the hook is concave inwardly in a radial direction of the commutator relative to the contacting surface of the corresponding segment and forms an increased space for accommodating the lead wire of the windings, the hook having a reduction in thickness at a portion corresponding to the increased space.

4. The engine cooling system of claim 1, wherein the windings comprise a plurality of coils, each of the coils being wound about one tooth of the rotor core.

5. The engine cooling system of claim 1, wherein the windings comprise a plurality of coils, each of the coils being wound about two or more teeth of the rotor core.

6. A cooling fan used in an engine cooling system, the cooling fan comprising a motor, fan blades driven by the motor to cool an engine, wherein the motor comprises a stator and a rotor rotatable mounted confronting the stator; the rotor comprising a shaft, a commutator fitted to the shaft, a rotor core fitted to the shaft adjacent to the commutator, windings wound about teeth of the rotor core and electrically connected to segments of the commutator; the windings being formed from aluminum cored wire that has an electrical insulation film around its peripheral surface, wherein each of the hooks at a position adjoining a corresponding segment is concave inwardly along a radial direction of the commutator relative to a contacting surface of the corresponding segment to thereby form an increased space for accommodating lead wire of the windings.

7. The motor of claim 6, wherein each of the segments comprises a hook at one end, the hook having tin coating to electrically connect to the lead wires of the windings.

8. The motor of claim 7, wherein each lead wire of the windings is soldered to a corresponding hook.

9. The motor of claim 7, wherein the lead wires and hooks are encapsulated by a protective film after the lead wires and the hooks are soldered together, for preventing the soldered hooks and lead wires of the windings from being corroded by oxygen and/or moisture.

10. The motor of claim 6, wherein the aluminum cored wire is copper clad aluminum wire.

11. A motor used in an engine cooling system comprising fan blades driven by the motor to cool an engine, wherein the motor comprises a stator and a rotor rotatably mounted confronting the stator; the rotor comprising a shaft, a commutator fitted to the shaft, a rotor core fitted to the shaft adjacent to the commutator, windings wound about teeth of the rotor core and electrically connected to segments of the commutator, the windings being formed from copper clad aluminum wire, wherein each of the segments comprises a hook formed at one end thereof, each of the hooks at a position adjoining the corresponding segment is concave inwardly along a radial direction of the commutator relative to a contacting surface of the corresponding segment to thereby form an increased space for accommodating a lead wire of the windings, protective films respectively encapsulating the lead wires and hooks after the lead wires and hooks are soldered together for preventing the soldered hooks and lead wires of the windings from being corroded by oxygen and/or moisture.

12. A motor used in an engine cooling system comprising a fan driven by the motor to cool an engine, wherein the motor comprises a stator and a rotor rotatably mounted confronting the stator; the rotor comprising a shaft, a commutator fitted to the shaft, a rotor core fitted to the shaft adjacent to the commutator, windings wound about teeth of the rotor core and electrically connected to segments of the commutator, the windings being formed from copper clad aluminum wire, wherein each of the segments comprises a hook formed at one end thereof, each of the hooks having a portion with a reduced thickness forming a concave providing an increased space for accommodating a lead wire of the windings.

\* \* \* \* \*